US012149024B2

(12) United States Patent
Lin et al.

(10) Patent No.: US 12,149,024 B2
(45) Date of Patent: Nov. 19, 2024

(54) ELECTRICAL CONNECTOR ASSEMBLY

(71) Applicants: Chun-Cheng Lin, Taipei (TW); Shy-Luen Chern, Taipei (TW); Chih-Hsiang Tang, Taipei (TW); Hong-Wen Lee, Taipei (TW)

(72) Inventors: Chun-Cheng Lin, Taipei (TW); Shy-Luen Chern, Taipei (TW); Chih-Hsiang Tang, Taipei (TW); Hong-Wen Lee, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 364 days.

(21) Appl. No.: 17/853,861

(22) Filed: Jun. 29, 2022

(65) Prior Publication Data

US 2023/0023998 A1 Jan. 26, 2023

Related U.S. Application Data

(60) Provisional application No. 63/225,579, filed on Jul. 26, 2021.

(51) Int. Cl.
*H01R 13/62* (2006.01)
*H01R 13/17* (2006.01)
(Continued)

(52) U.S. Cl.
CPC ......... *H01R 13/6205* (2013.01); *H01R 13/17* (2013.01); *H01R 13/2421* (2013.01);
(Continued)

(58) Field of Classification Search
CPC .......... H04R 1/02; H04R 1/026; H04R 1/025; F16M 13/02; F16M 11/041; F16M 13/00;
(Continued)

(56) References Cited

U.S. PATENT DOCUMENTS

| | | | |
|---|---|---|---|
| 9,147,957 B2 * | 9/2015 | Randolph | H01R 24/20 |
| 10,491,024 B2 | 11/2019 | Olson et al. | |
| 10,939,564 B2 * | 3/2021 | Xie | H05K 5/0017 |

FOREIGN PATENT DOCUMENTS

| | | |
|---|---|---|
| CN | 106025690 | 10/2016 |
| CN | 107359443 | 11/2017 |
| TW | 597902 | 9/2017 |

* cited by examiner

*Primary Examiner* — Briggitte R. Hammond
(74) *Attorney, Agent, or Firm* — JCIPRNET

(57) ABSTRACT

An electrical connector assembly including a first connector and a second connector to be mated with each other is provided. The first connector includes a first body, and at least one first terminal and multiple second terminals disposed therein. The second terminals are symmetrically arranged at opposite sides of the first terminal. The second connector includes a second body, at least one third terminal movably disposed in the second body, multiple fourth terminals disposed in the second body and symmetrically arranged at opposite sides of the third terminal, and a driving module electrically connected to at least one of the fourth terminals and structurally connected to the third terminal. In the mating process of the first and second connector, the second terminals and the fourth terminals are electrically connected firstly, to trigger the driving module to move the third terminal to be structurally and electrically connected to the first terminal.

18 Claims, 6 Drawing Sheets

(51) Int. Cl.
*H01R 13/24* (2006.01)
*H01R 13/502* (2006.01)
*H01R 13/629* (2006.01)

(52) U.S. Cl.
CPC ......... *H01R 13/502* (2013.01); *H01R 13/629* (2013.01); *Y10S 439/9241* (2013.01)

(58) Field of Classification Search
CPC .. G10D 3/00; G10D 1/08; G10H 3/12; G10H 3/186; G10H 1/32
See application file for complete search history.

ELECTRICAL CONNECTOR ASSEMBLY

CROSS-REFERENCE TO RELATED APPLICATION

This application claims the priority benefit of U.S. application Ser. No. 63/225,579, filed on Jul. 26, 2021. The entirety of the above-mentioned patent application is hereby incorporated by reference herein and made a part of this specification.

BACKGROUND

Technical Field

The disclosure relates to an electrical connector assembly.

Description of Related Art

In general, the operation of an electronic device needs to be controlled through various transmission interfaces or electrical connectors to charge or transmit signals to the electronic device. The transmission interfaces or electrical connectors are mostly configured by arranging a plurality of conductive terminals in an insulator, so as to facilitate the user to complete the connection or release through plugging and unplugging.

However, the user's plugging and unplugging operations do not always meet the needs of the electrical connector. In other words, the magnitude and direction of the user's force cannot be guaranteed to be the same every time, which may cause the electrical connector to be in a state of instability such as skew, and even if such an unstable state meets the requirements for electrical conduction, the power supply is likely to be unstable and even cause damage to the electronic device.

Accordingly, how to provide insurance means to confirm that the connector has been correctly and stably connected before the electronic device is charged or the signal is transmitted is an issue that needs to be considered and solved by relevant technical personnel.

SUMMARY

The disclosure provides an electrical connector assembly, which ensures that error-free mating of the connector by the electrical conduction sequence of the terminals in the mating process.

The electrical connector assembly of the disclosure includes a first connector and a second connector to be mated with each other. The first connector includes a first body; and at least one first terminal and a plurality of second terminals disposed in the first body, and the second terminals are symmetrically arranged at two opposite sides of the first terminal. The second connector includes a second body; at least one third terminal; a plurality of fourth terminals; and a driving module. The third terminal is movably disposed in the second body, and the fourth terminals are disposed in the second body and symmetrically arranged at two opposite sides of the third terminal. The driving module is electrically connected to at least one of the fourth terminals and is structurally connected to the third terminal. In a mating process of the first connector and the second connector, the second terminals and the fourth terminals are electrically connected firstly, so as to trigger the driving module to move the third terminal to be structurally and electrically connected to the first terminal.

In an embodiment of the disclosure, a contact end of the first terminal is located on a plane one; contact ends of the second terminals are located on a plane two; the plane one is different from the plane two; and a distance between the plane one and the first body is smaller than a distance between the plane two and the first body.

In an embodiment of the disclosure, a contact end of the third terminal is located on a plane three; contact ends of the fourth terminals are located on a plane four; and the plane three is different from the plane four. In the mating process and when the first terminal is not in contact with the third terminal, a distance between the plane three and the first connector is larger than a distance between the plane four and the first connector.

In an embodiment of the disclosure, the second terminals include at least one fifth terminal and at least one sixth terminal; the fifth terminal is adjacent to the first terminal; and the sixth terminal is far away from the first terminal.

In an embodiment of the disclosure, when the first connector is not mated with the second connector, a contact end of the first terminal is located on a plane one; a contact end of the fifth terminal is located on the plane two; the plane one is different from plane two; and a distance between the plane one and the first body is smaller than a distance between the plane two and the first body.

In an embodiment of the disclosure, a contact end of the sixth terminal is located on the plane one.

In an embodiment of the disclosure, a terminal length of the sixth terminal is smaller than a terminal length of the fifth terminal.

In an embodiment of the disclosure, the second terminals include a pair of the sixth terminals, which are, among the first terminal and the second terminals, terminals arrange on an outermost side.

In an embodiment of the disclosure, a pin assignment of the first terminal and third terminal is a signal detection terminal, and a pin assignment of the sixth terminal is a power terminal or a ground terminal.

In an embodiment of the disclosure, the first terminal and the second terminal are pogo pins.

In an embodiment of the disclosure, a terminal length of the first terminal is the same as terminal lengths of the second terminals, and a position of the first terminal in the first body is different from positions of the second terminals in the first body.

In an embodiment of the disclosure, in a mating axis direction of the first connector and the second connector, a position of the first terminal in the first body is the same as positions of the second terminals in the first body, and a terminal length of the first terminal is smaller than terminal lengths of the second terminals.

In an embodiment of the disclosure, the driving module includes an electromagnet composed of a magnetic core, and a coil surrounding the magnetic core. The magnetic core is structurally connected to the third terminal, and the coil is electrically connected to at least two of the fourth terminals. In the mating process, a current generated flows through the coil and generates a magnetic force when the second terminals and the fourth terminals are electrically connected, so as to drive the magnetic core to move the third terminal towards and to be abutted against the first terminal.

In an embodiment of the disclosure, the driving module further includes a spring abutted between the second body and the magnetic core. When the coil does not generate the magnetic force, the magnetic core and the third terminal are reset by the spring.

In an embodiment of the disclosure, in the mating process, the first connector and the second connector are mated with each other along a first axis direction; the first terminal and the second terminals are arranged in the first body along a second axis direction; the third terminal and the fourth terminals are arranged in the second body along the second axis direction; and the first axis direction is orthogonal to the second axis direction.

Based on the above, according to the electrical connector assembly, at least one movable third terminal is provided in the second body of the second connector, and at the same time, the driving module is electrically connected to the fourth terminals located at two opposite sides of the third terminal and structurally connected to the third terminal, such that the third terminal may be controlled by the driving module to move back and forth in the second body.

Accordingly, in the mating process of the first connector and the second connector, the second terminals of the first connector and the fourth terminals of the second connector are mated firstly. At this time, the first terminal of the first connector and the third terminal of the second connector are still spaced apart without contact. The mating of the second terminals and the fourth terminals will implement electrical conduction, and the conduction current is for triggering the driving module, such that the driving module may drive the third terminal to move relative to the second body and to be abutted against the first terminal to implement electrical conduction. At this point, the first connector and the second connector are in a state where all terminals are mated, and charging or signal transmission is possible.

In other words, according to the electrical connector assembly of the disclosure, whether the second terminals and the fourth terminals are electrically conductive serves as a prerequisite for triggering the driving module to drive the third terminal to move towards and to be abutted against the first terminal, so as to provide a secure measure ensuring smooth and stable mating of the electrical connector assemblies.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
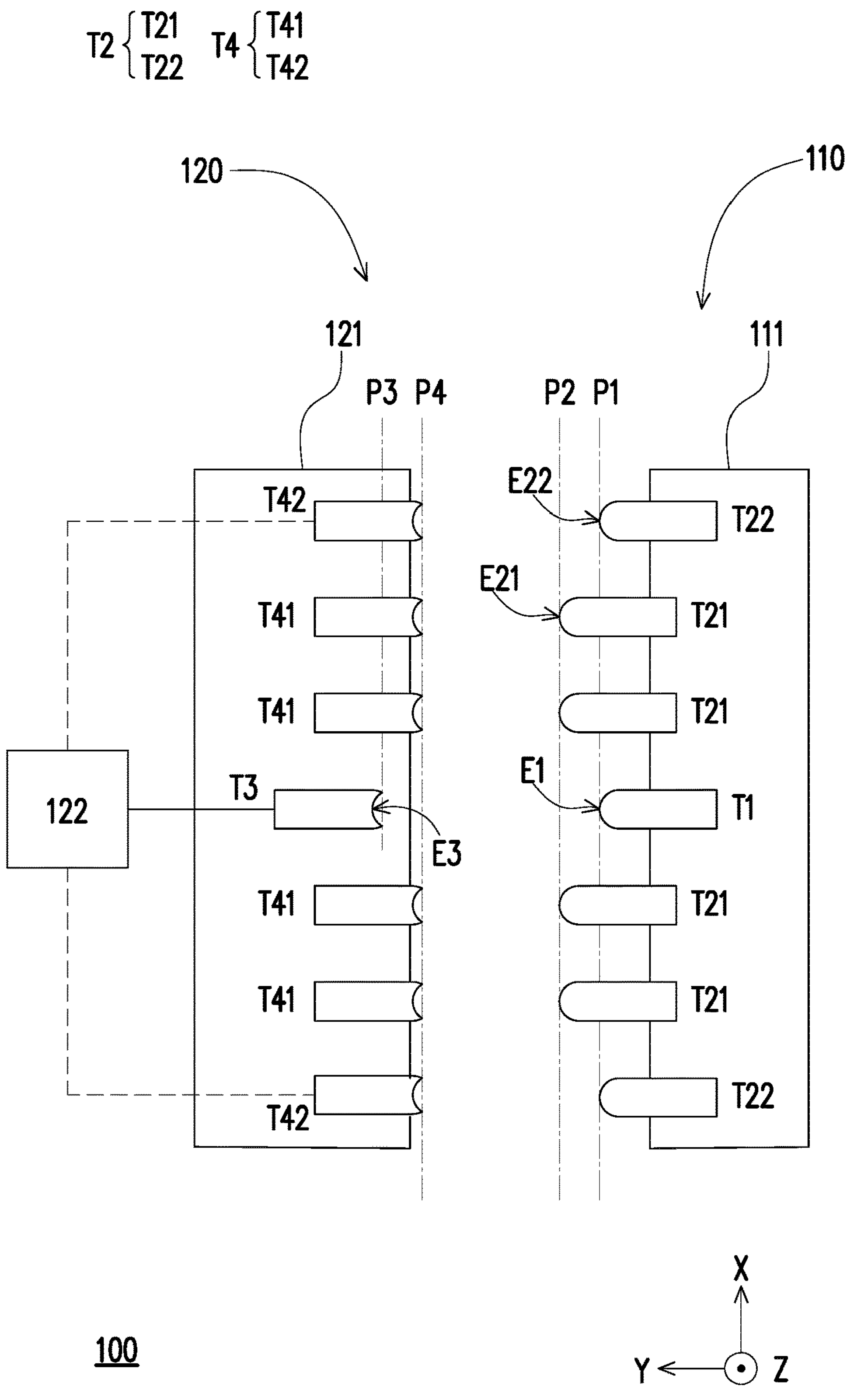
FIG. 1 is a simple schematic diagram of an electrical connector assembly according to an embodiment of the disclosure.

Reference will now be made in detail to the exemplary embodiments of the disclosure, examples of which are illustrated in the accompanying drawings. Wherever possible, the same reference numbers are used in the drawings and the description to refer to the same or like parts.

Figure 2:
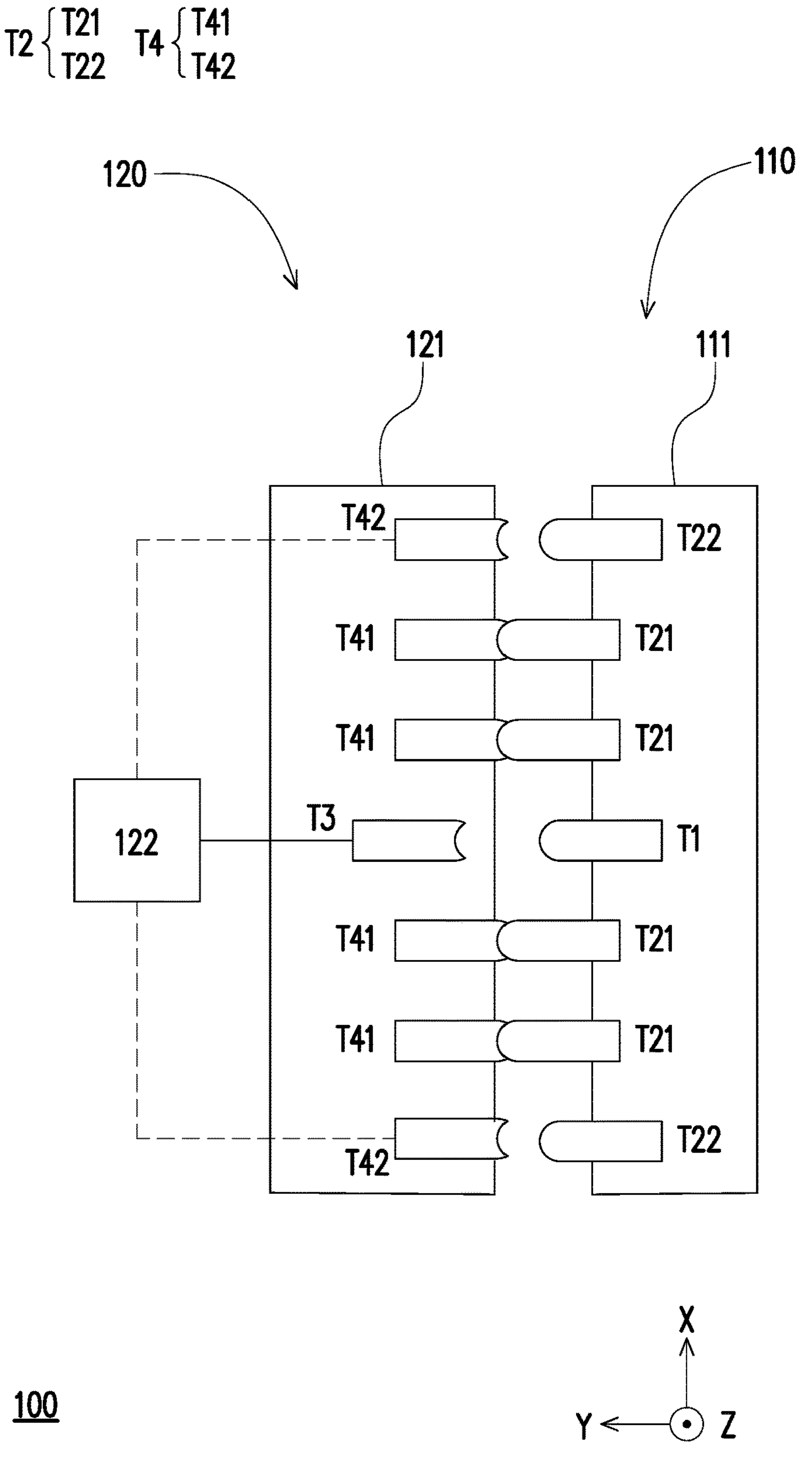
FIGS. 2 and 3 are a mating process of the electrical connector assembly of FIG. 1.
Figure 3:
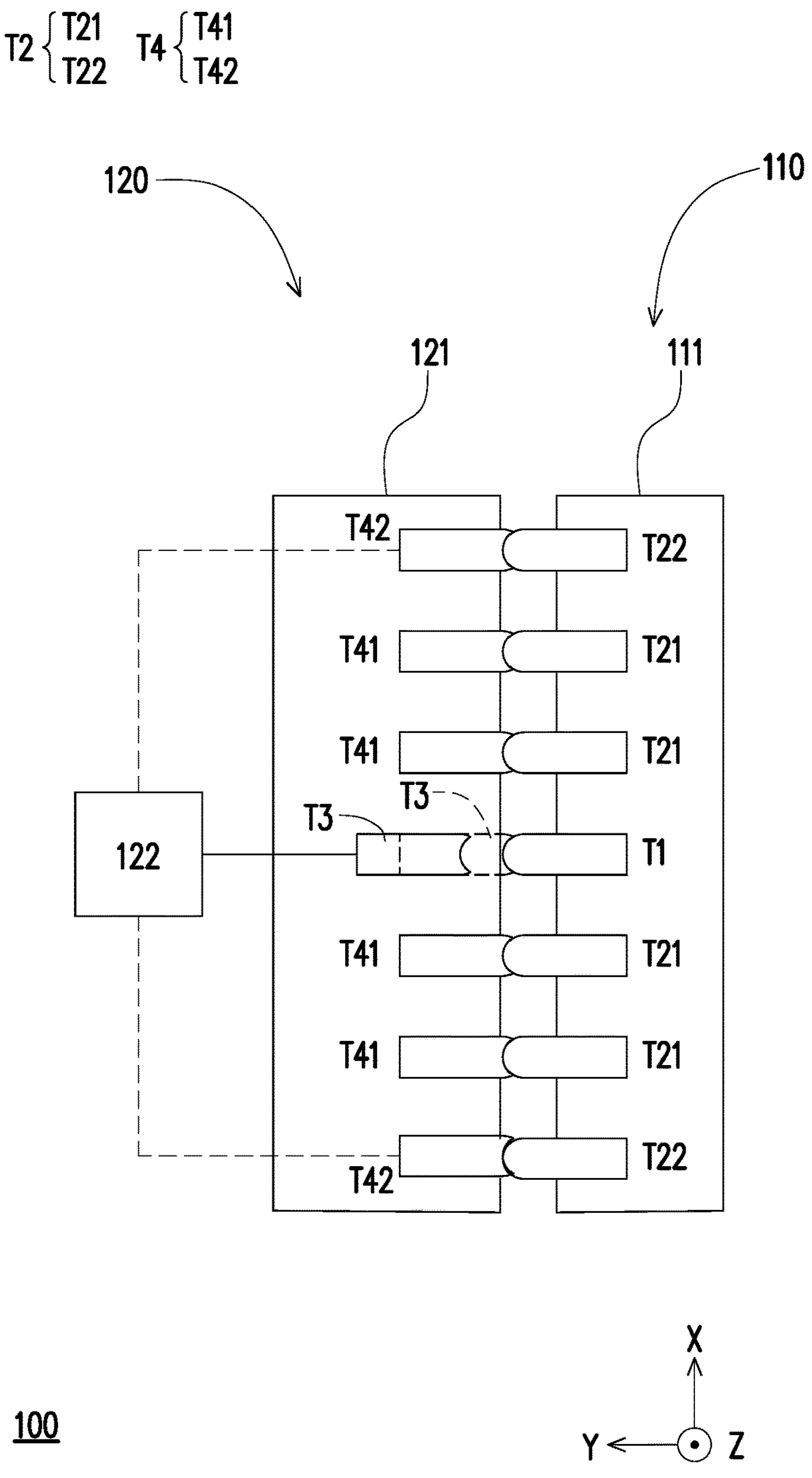

FIG. 1 is a simple schematic diagram of an electrical connector assembly according to an embodiment of the disclosure, which shows a state when the electrical connector assembly is not yet mated. FIGS. 2 and 3 are a mating process of the electrical connector assembly. Cartesian coordinates X-Y-Z are provided here to facilitate component description. Referring to FIG. 1 to FIG. 3 at the same time, in this embodiment, an electrical connector assembly 100 includes a first connector 110 and a second connector 120 to be mated with each other, and the Y-axis is taken as the mating axis direction of the two. The first connector 110 includes a first body 111; and a first terminal T1 and a plurality of second terminals T2 disposed in the first body 111. The second terminals T2 are symmetrically arranged at two opposite sides of the first terminal T1, wherein the first body 111 has, for example, an insulating structure for accommodating conductive terminals (the first terminal T1 and the second terminals T2). The second connector 120 includes a second body 121, a third terminal T3, a plurality of fourth terminals T4, and a driving module 122. The third terminal T3 is movably disposed in the second body 121, and the fourth terminals T4 are disposed in the second body 121 and symmetrically arranged at two opposite sides of the third terminal T3, wherein the second body 121 has, for example, an insulating structure for accommodating conductive terminals (the third terminal T3 and fourth terminals T4). The driving module 122 is electrically connected to at least one of the fourth terminals T4 and is structurally connected to the third terminal T3. In a mating process of the first connector 110 and the second connector 120, the second terminals T2 and the fourth terminals T4 are electrically connected firstly, so as to trigger the driving module 122 to move the third terminal T3 to be structurally and electrically connected to the first terminal T1. Herein the solid lines represents the structural connection relationship, and the dotted line represents the electrical connection relationship, which will be further described in the following.

Further, the first connector 110 and the second connector 120 in this embodiment are flat electrical connectors corresponding to each other. In other words, the first terminal T1 and the second terminals T2 of the first connector 110 are arranged one by one along the X-axis, and the third terminal T3 and the fourth terminals T4 of the second connector 120 are also arranged one by one along the X-axis. Further, when the first connector 110 is mated with the second connector 120 along the Y-axis, the terminals may have a corresponding relationship with each other, wherein the first terminal T1 and the third terminal T3 are, for example, signal detection terminals of the connectors.

More importantly, as shown in FIG. 1, when not mated, a contact end E1 of the first terminal T1 of the first connector 110 is located on a plane one P1, where the plane one P1 is parallel to an X-Z plane, and the second terminals T2 of the first connector 110 further include at least one fifth terminal T21 and at least one sixth terminal T22. The fifth terminal T21 is adjacent to the first terminal T1, and the sixth terminal T22 is far away from the first terminal T1 and is, for example, a power terminal or a ground terminal of the connector. Here, a contact end E21 of the fifth terminal T21 (only one thereof is indicated) is located on a plane two P2, and a contact end E22 of the sixth terminal T22 (only one thereof is indicated) is located on the plane one P1, wherein the plane two P2 is also parallel to the X-Z plane but different from the plane one P1. In other words, as shown in FIG. 1, the terminals of the first connector 110 have the same length but are located at different positions on the first body 111 along the Y-axis. The contact end E1 of the first terminal T1 located in a center and the contact end E22 of the sixth terminal T22 located at an outermost position are in the same position on the Y-axis, and a distance between the plane two P2 and the first body 111 is made larger than a distance between the plane one P1 and the first body 111, such that the arrangement of the first terminal T1 and the second terminals T2 forms a step in an Y-axis direction.

For the second connector 120, when it is not mated with the first connector 110, as shown in FIG. 1, a contact end E3 of the third terminal T3 is located on a plane three P3, contact ends of the fourth terminals T4 are located on a plane four P4, and the plane three P3 is different from the plane four P4 but is also parallel to the X-Z plane. Also, in this embodiment, the contact ends of the fourth terminals T4 protrude from the second body 121 while the third terminal T3 is submerged in the second body 121, such that the third terminal T3 lags behind the fourth terminals T4 in the mating process of the first connector 110 and the second connector 120, which means that when the first terminal T1 is not in contact with the third terminal T3, a distance between the plane three P3 and the first connector 110 is larger than a distance between the plane four P4 and the first connector 110. Corresponding to the first connector 110, the fourth terminals T4 of the second connector 120 further include a seventh terminal T41 and a eighth terminal T42. The seventh terminal T41 is adjacent to the third terminal T3, and the eighth terminal T42 is far away from the third terminal T3. Corresponding to the first connector 110, the eighth terminal T42 is, among the third terminal T3 and the fourth terminals T4, a terminal arranged on an outermost side.

In the mating process along the Y-axis, the terminals are mated in stages because of the configuration in which the contact ends of the terminals are located in different planes. Moreover, it should be mentioned that the first terminal T1 and the second terminal T2 of this embodiment are both pogo pins, which may cause following influence in the mating process: as shown in FIG. 1 and FIG. 2, the fifth terminal T21 of the second terminals T2 will first be connected to the seventh terminal T41 of the fourth terminals T4 in the mating process, where at this time, the sixth terminal T22 and the eighth terminal T42 is still spaced apart along the Y-axis. Therefore, the first connector 110 and the second connector 120 still needs to be pressed to move closer to each other, until the sixth terminal T22 of the second terminals T2 are mated with the eighth terminal T42 of the fourth terminals T4 as shown in FIG. 3, where at this time, the mating of the second terminals T2 and the fourth terminals T4 is completed. Here, the spring deformation process of the pogo pin may be appropriately adjusted according to the assembly process and characteristics of the connectors.

Next, after the sixth terminal T22 is mated with the eighth terminal T42 to implement electrical conduction, the driving module 122 is then triggered to further drive the driving module 122 to move the third terminal T3 along the Y-axis and finally cause the third terminal T3 to be structurally and electrically connected to the first terminal T1, thereby completing the mating of the first connector 110 and the second connector 120. The third terminal T3 shown in FIG. 3 with a solid outline and a dotted outline represents the position of the third terminal T3 before and after being driven.

It should also be mentioned that, in another embodiment of the disclosure, the first connector may also have the state shown in FIG. 3 as its initial state. In other words, the plurality of second terminals T2 are all located on the same plane. However, at this time, it is necessary to provide a corresponding electrical circuit for each connected second terminal T2 as a basis for determining whether to drive the third terminal T3, so as to ensure that each mated second terminal T2 has been electrically connected.

Figure 4:
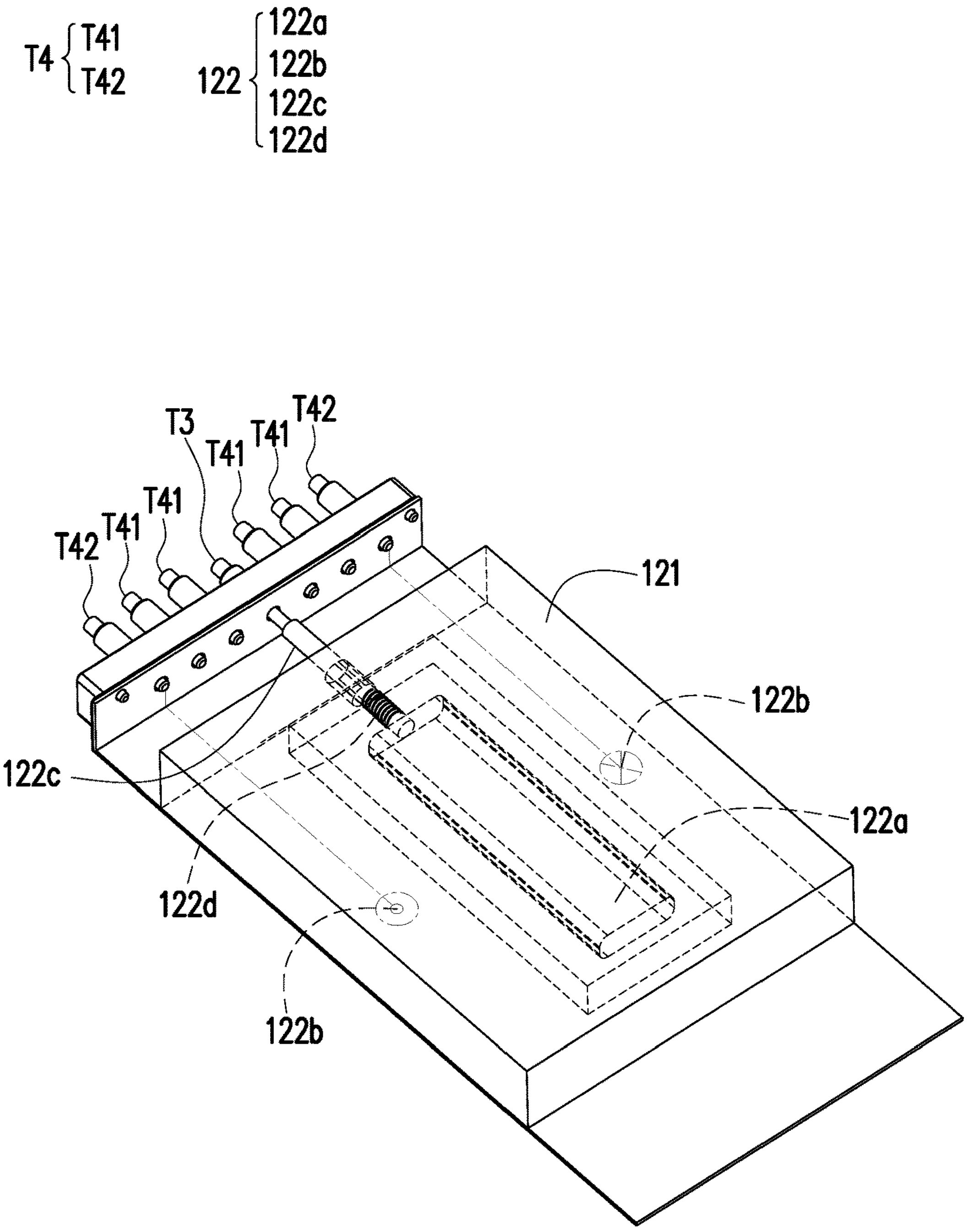
FIG. 4 is a schematic structural diagram of a second connector according to an embodiment of the disclosure.

FIG. 4 is a schematic structural diagram of a second connector according to this embodiment. Here, a part of the structure of the second connector 120 is shown as an example, and it is shown in partial perspective and the components are simplified for easy understanding. Referring to FIG. 4 and any one of FIGS. 1 to 3, in this embodiment, the driving module 122 includes an electromagnet composed of a magnetic core 122*a*, and a coil 122*b* surrounding the magnetic core 122*a*. The magnetic core 122*a* is structurally connected to the third terminal T3 through a push rod 122*c*, and the coil 122*b* is electrically connected to at least two of the fourth terminals T4, especially the two terminals with which the fourth terminals T4 are mated lastly, namely the two outermost eighth terminals T42 in this embodiment. In the mating process, when the sixth terminal T22 of the second terminals T2 and the eighth terminal T42 of the fourth terminals T4 are electrically connected, a current will be generated through the coil 122*b*, and a magnetic force will be generated accordingly, which will then drive the magnetic core 122*a* to move the third terminal T3 towards and to be abutted against the first terminal T1 via the push rod 122*c*, as shown in FIG. 3. Furthermore, the driving module 122 further includes a spring 122*d* abutted between the second body 121 and the magnetic core 122*a*. When the coil 122*b* does not generate a magnetic force, the magnetic core 122*a* and the third terminal T3 may be reset by the spring 122*d*.

Further, since in this embodiment, since whether the outermost terminal of the second terminal T2 and the fourth terminal T4, namely the sixth terminal T22 and the eighth terminal T42, are mated is taken as the basis for determining whether the driving module 122 is to drive the third terminal T3, if skew occurs when the connectors are mated, the outermost terminal will obviously be electrical disconnected.

Figure 5:
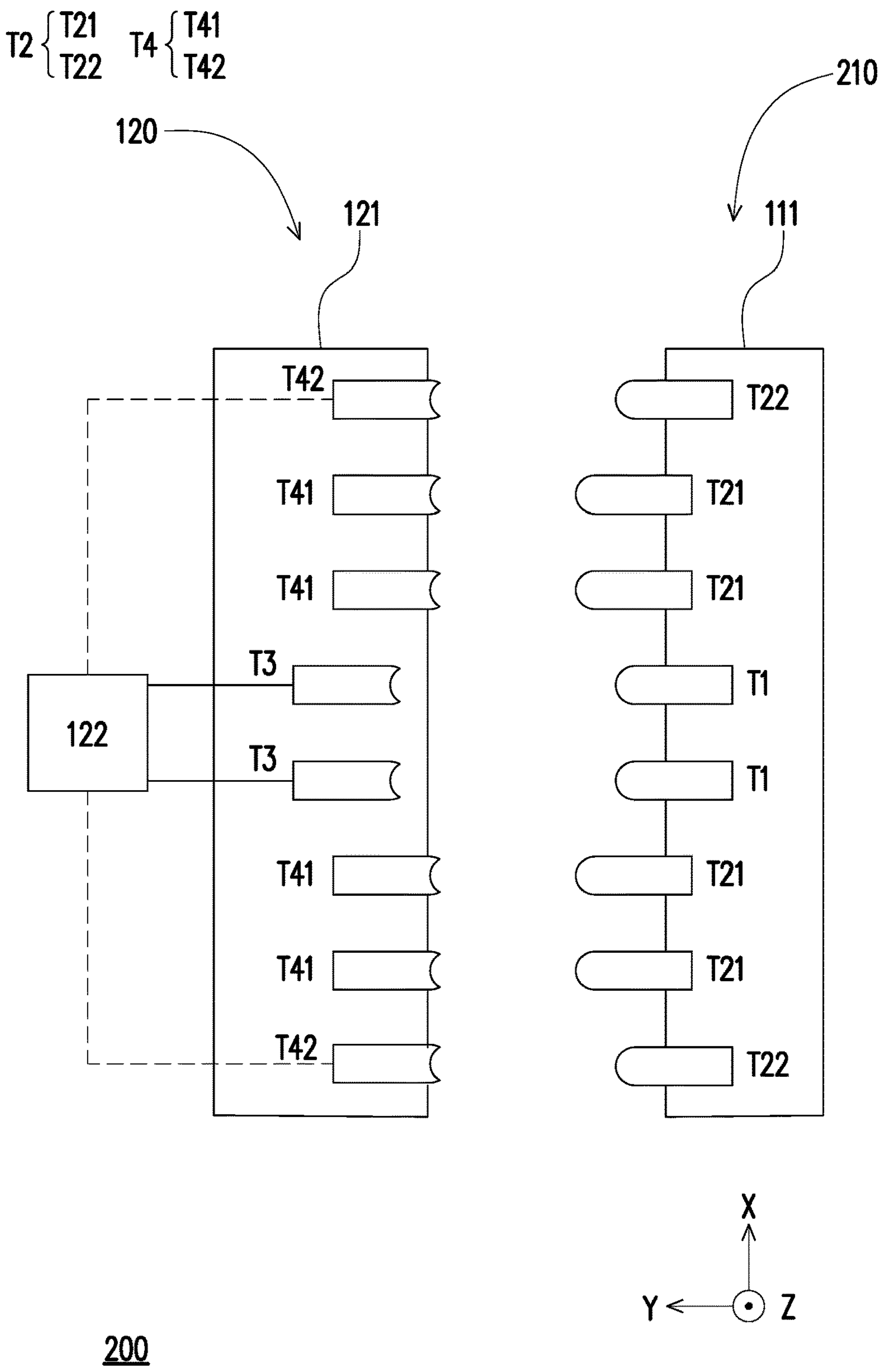
FIG. 5 is a simple schematic diagram of an electrical connector assembly according to another embodiment of the disclosure.

FIG. 5 is a simple schematic diagram of an electrical connector assembly according to another embodiment of the disclosure. Different from the previous embodiment, in an electrical connector assembly 200 of this embodiment, a first connector 210 and a second connector 220 each have an even number of terminals. In other words, there are an even number of first terminals T1 and an even number of third terminals T3, but what remains unchanged is that an electrical circuit is provided to the outermost terminals, namely the sixth terminal T22 and the eighth terminal T42, as a basis for determining whether to trigger the driving module 122. At the same time, all kinds of connectors designed according to this principle are capable of forward and backward plugging.

Figure 6:
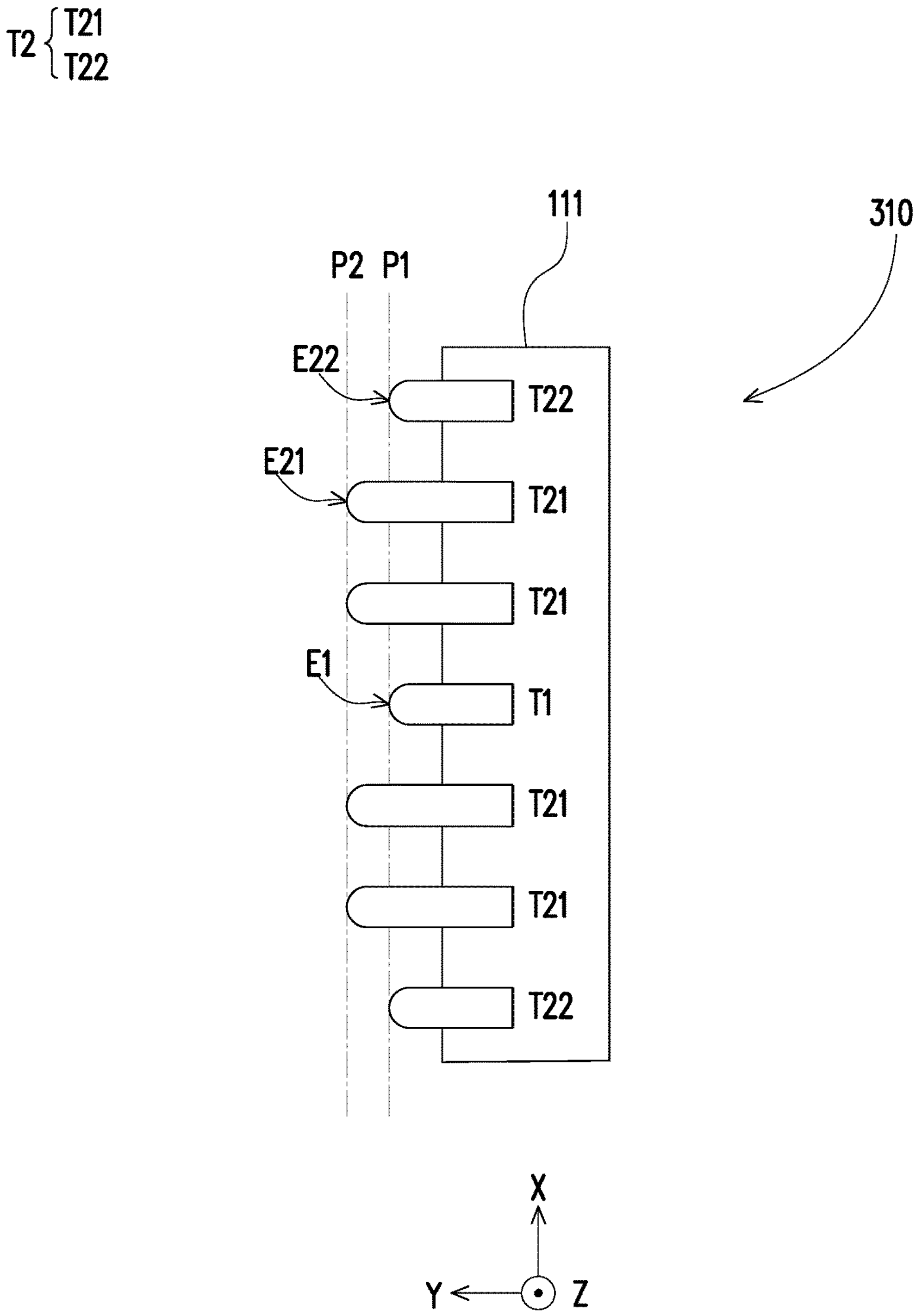
FIG. 6 is a simple schematic diagram of a first connector according to another embodiment of the disclosure.

FIG. 6 is a simple schematic diagram of a first connector according to another embodiment of the disclosure. Referring to FIG. 6, the difference from the previous embodiment is that in a first connector 310 of this embodiment, the first terminal T1 and the second terminals T2 have different lengths, and the fifth terminal T21 and the sixth terminal T22 of the second terminal T2 also have different lengths. Further, in this embodiment, the terminal length of the first terminal T1 is smaller than or equal to the terminal length of the second terminal T2, and the terminal length of the sixth terminal T22 is smaller than the terminal length of the fifth terminal T21. Thus, even though the terminals of this embodiment are disposed in the same position in the first body 111 (all with the same Y-coordinates), because of length difference, the terminals of this embodiment may still maintain the step required in the above embodiments.

In summary, according to the electrical connector assembly, at least one movable third terminal is provided in the second body of the second connector, and at the same time, the driving module is electrically connected to the fourth terminals located at two opposite sides of the third terminal and structurally connected to the third terminal, such that the third terminal may be controlled by the driving module to move back and forth in the second body.

Further, to avoid skew when the connectors are mated, the embodiments of the disclosure provide an electrical circuit for the outermost terminals of the connector, so as to generate a trigger signal when the outermost terminals of the first connector and the second connector are mated, such that the driving module moves the third terminal, thereby completing the final terminal mating operation. In other words, the mating operation of the terminals is performed in stages, and a next stage is performed after a previous stage is completed, thereby providing secure measure ensuring smooth and stable mating of the electrical connector assemblies.

It will be apparent to those skilled in the art that various modifications and variations may be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. An electrical connector assembly, comprising:
- a first connector, comprising:
  - a first body;
  - at least one first terminal and a plurality of second terminals disposed in the first body, the second terminals symmetrically arranged at two opposite sides of the at least one first terminal;
- a second connector to be mated with the first connector, the second connector comprising:
  - a second body;
  - at least one third terminal movably disposed in the second body;
  - a plurality of fourth terminals disposed in the second body and symmetrically arranged at two opposite sides of the at least one third terminal; and
  - a driving module electrically connected to at least one of the fourth terminals and structurally connected to the at least one third terminal,
  - wherein in a mating process of the first connector and the second connector, the second terminals and the fourth terminals are electrically connected firstly, so as to trigger the driving module to move the at least one third terminal to be structurally and electrically connected to the at least one first terminal.

2. The electrical connector assembly according to claim 1, wherein the at least one first terminal and the second terminals respectively protrude from the first body, and when the first connector is not mated with the second connector, a contact end of the at least one first terminal is located on a plane one; contact ends of the second terminals are located on a plane two; the plane one is different from the plane two; and a distance between the plane one and the first body is smaller than a distance between the plane two and the first body.

3. The electrical connector assembly according to claim 2, wherein the second terminals comprise at least one fifth terminal and at least one sixth terminal; the at least one fifth terminal is adjacent to the at least one first terminal; and the at least one sixth terminal is far away from the at least one first terminal, and when the first connector is not mated with the second connector, a contact end of the at least one fifth terminal is located on the plane two; and a contact end of the at least one sixth terminal is located on the plane one.

4. The electrical connector assembly according to claim 3, wherein a terminal length of the at least one sixth terminal is smaller than a terminal length of the at least one fifth terminal.

5. The connector assembly according to claim 3, wherein the sixth terminal is, among the at least one first terminal and the second terminals, a terminal arranged on an outermost side.

6. The electrical connector assembly according to claim 5, wherein the second terminals comprise a pair of the sixth terminals.

7. The electrical connector assembly according to claim 3, wherein a pin assignment of the sixth terminal is a power terminal or a ground terminal.

8. The electrical connector assembly according to claim 1, wherein a contact end of the at least one third terminal is located on a plane three; contact ends of the fourth terminals are located on a plane four; and the plane three is different from the plane four, and in the mating process and when the at least one first terminal is not in contact with the at least one third terminal, a distance between the plane three and the first connector is larger than a distance between the plane four and the first connector.

9. The electrical connector assembly according to claim 8, wherein the fourth terminals comprise at least one seventh terminal and at least one eighth terminal; the at least one seventh terminal is adjacent to the at least one third terminal; the at least one eighth terminal is far away from the at least one third terminal; and the at least one eighth terminal is, among the at least one third terminal and the fourth terminals, a terminal arranged on an outermost side.

10. The electrical connector assembly according to claim 9, wherein the fourth terminals comprise a pair of the eighth terminals.

11. The electrical connector assembly according to claim 9, wherein a pin assignment of the at least one eighth terminal is a power terminal or a ground terminal.

12. The electrical connector assembly according to claim 1, wherein a pin assignment of the at least one first terminal and the at least one third terminal is a signal detection terminal.

13. The electrical connector assembly according to claim 1, wherein the at least one first terminal and the second terminals are pogo pins.

14. The electrical connector assembly according to claim 1, wherein a terminal length of the at least one first terminal is the same as terminal lengths of the second terminals, and in a mating axis direction of the first connector and the second connector, a position of the at least one first terminal in the first body is different from positions of the second terminals in the first body.

15. The electrical connector assembly according to claim 1, wherein in a mating axis direction of the first connector and the second connector, a position of the at least one first terminal in the first body is the same as positions of the second terminals in the first body, and a terminal length of the at least one first terminal is smaller than terminal lengths of the second terminal.

16. The electrical connector assembly according to claim 1, wherein the driving module comprises an electromagnet composed of a magnetic core; and a coil surrounding the magnetic core, wherein the magnetic core is structurally connected to the at least one third terminal; the coil is electrically connected to at least two of the fourth terminals; and in the mating process, a current generated flows through the coil and generates a magnetic force when the second terminals and the fourth terminals are electrically connected, so as to drive the magnetic core to move the at least one third terminal towards and to be abutted against the at least one first terminal.

17. The electrical connector assembly according to claim 16, wherein the driving module further comprises a spring abutted between the second body and the magnetic core, and when the coil does not generate the magnetic force, the magnetic core and the at least one third terminal are reset by the spring.

18. The electrical connector assembly according to claim 1, wherein in the mating process, the first connector and the second connector are mated with each other along a first axis direction; the at least one first terminal and the second terminals are arranged in the first body along a second axis direction; the at least one third terminal and the fourth terminals are arranged in the second body along the second axis direction, and the first axis direction is orthogonal to the second axis direction.

* * * * *